G. A. CRUM.
THREE HORSE EQUALIZER.
APPLICATION FILED APR. 2, 1907.
905,990.
Patented Dec. 8, 1908.
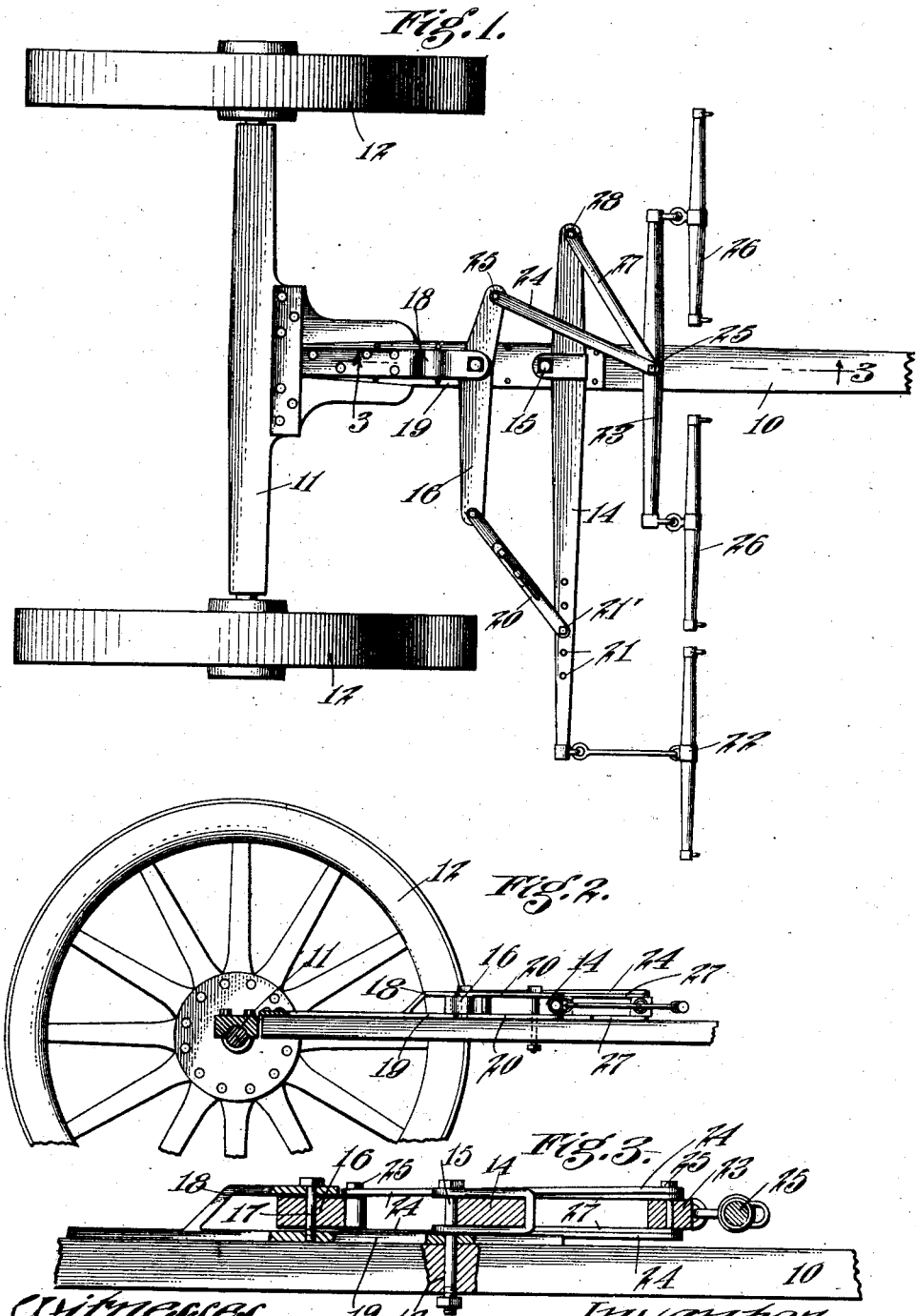

UNITED STATES PATENT OFFICE.

GEORGE A. CRUM, OF LOS ANGELES, CALIFORNIA.

THREE-HORSE EQUALIZER.

No. 905,990.  Specification of Letters Patent.  Patented Dec. 8, 1908.

Application filed April 2, 1907. Serial No. 365,974.

*To all whom it may concern:*

Be it known that I, GEORGE A. CRUM, a citizen of the United States, residing at Los Angeles, in the county of Los Angeles and State of California, have invented new and useful Improvements in Three-Horse Equalizers, of which the following is a specification.

My invention relates to a form of draft equalizer which is particularly adapted to equalize the pull of three horses; and it is an object thereof to produce an equalizer which will allow of two of the horses being placed in their usual positions on each side of the wagon tongue, so that they may be used for backing and turning just as in a two horse team.

A further object is to provide an equalizer which may be adjusted to the individual pulling power of the horses.

A further object is to provide an equalizer which may be put onto and removed from the tongue quickly, and which will not interfere in any way, when removed, with the ordinary two horse arrangement.

I accomplish these objects by means of the device described herein and illustrated in the accompanying drawings, in which:—

Figure 1— is a plan view of my device attached to a wagon tongue. Fig. 2— is a side elevation of the same, one of the wheels being removed. Fig. 3— is a section on line 3—3 of Fig. 1.

In the drawings 10 designates an ordinary wagon tongue attached in the usual manner to an axle 11 carrying wheels 12. A bolt hole 13 is shown in Fig. 3 being the hole by means of which the ordinary double tree is attached. In my device I attach equalizer tree 14 to the tongue by passing its bolt 15 through this hole. Mounted immediately in the rear of equalizer tree 14 is an auxiliary equalizer tree 16 pivotally secured by bolt 17 between straps 18 and 19. The ends of the auxiliary tree are unequal in length, one end being twice as long as the other. The long end is connected to the long end of equalizer tree 14 by straps 20. Holes 21 are provided so that the point of attachment of straps 20, which are adjustable as to length, may be varied by moving bolt 21'. To the extreme outer end of equalizer tree 14 is attached the swingle tree 22. The short end of auxiliary tree 16 is pivotally connected to double tree 23 by straps 24. Double tree 23 carries the usual swingle tree 26. The short end of equalizer tree 14 is also pivotally connected to double tree 23 by straps 27 which are attached to tree 14 by bolt 28 and to the double tree by bolt 25.

It will be seen that the single horse pulls through two connections upon the double tree and that the two horses pull through two connections upon the swingle tree. The arms of lever 16 are in the proportion 2 to 1, while the arms of lever 14 are in a proportion somewhat more than 2 to 1. By this arrangement I design to give the single horse a small advantage, if anything, over the pair of horses, but the extra length of the single horse end of lever 14 will, in most cases, about make up for the diagonal pull which he has on the long end of lever 16. By providing two sets of straps, 24 and 27, the center of the double tree is transversely immovable, so that the pair of horses will be held in a central position. When it is desired to use only two horses the ordinary double tree may be attached to the tongue by means of bolt hole 13.

It will be observed that I have provided a three horse equalizer which is simple and efficient and which may be attached to a wagon tongue with a minimum amount of trouble, and which will not hinder the ordinary working of the wagon by two horses.

Having described my invention what I claim as new and desire to secure by Letters Patent is:—

In a three horse equalizer, a wagon tongue, a double tree centrally disposed over said wagon tongue, a swingle tree flexibly connected to each end of said double tree, a lever pivoted to said wagon tongue and comprising a long arm and a short arm, a second lever pivoted to the wagon tongue in the rear of the first named lever, said lever being considerably shorter than the first named lever and said second lever also comprising a short arm and a long arm, a swingle tree flexibly connected to the outer end of the long arm of the first named lever, a link pivoted at one end to the short arm of the first named lever, and at its other end to the center of the double tree, a second link pivoted at one end to the short arm of the second lever and at its other end to the center of the double tree and an adjustable member which connects the outer end of the long arm of the second lever with the long arm of the first named lever intermediate the outer end and the pivotal point of the latter an elongated strap located upon the upper face of the tongue and an integral short strap carried by the first named strap and spaced therefrom, said second lever being pivoted between said straps, the pivotal means of the first named lever comprising a bolt which passes through both the tongue and the elongated strap.

In witness that I claim the foregoing I have hereunto subscribed my name this 16th day of March, 1907.

GEORGE A. CRUM.

Witnesses:
TRIMBLE BARKELEW,
EDMUND A. STRAUSE.